July 9, 1957 C. B. FISHER 2,798,953

OSCILLATION GENERATORS

Filed Dec. 28, 1954

INVENTOR

C. B. FISHER

BY G H Stevenson

ATTY.

United States Patent Office 2,798,953
Patented July 9, 1957

2,798,953

OSCILLATION GENERATORS

Charles B. Fisher, Montreal, Quebec, Canada

Application December 28, 1954, Serial No. 478,032
4 Claims. (Cl. 250—36)

This invention relates to oscillation generators and more particularly to multi-frequency electronic oscillators of the feed-back type.

A principal object of the invention is to provide for the simultaneous generation in a single circuit of a plurality of oscillations of different frequencies highly stabilized as to both frequency and amplitude.

Other objects are to simplify the circuits of multi-frequency oscillators; to facilitate the adjustment of the several oscillation frequencies and to provide for independent stabilization of each oscillation.

Oscillation generators constructed in accordance with the invention employ a circuit arrangement similar to that of the stabilized oscillator disclosed in U. S. Patent No. 2,163,403, issued June 20, 1939, to L. A. Meacham. The circuit, in general, comprises an amplifying device and a Wheatstone's bridge network connected between the output and the input circuits of the amplifier to form a feed-back path. The Wheatstone's bridge includes a frequency determining impedance and is slightly unbalanced in such sense as to produce self oscillation of the system. It also includes amplitude stabilizing means in the form of variable resistance devices responsive to amplitude changes of the currents transversing them.

In accordance with the invention a single amplifier and a single Wheatstone's bridge feed-back network are used for the simultaneous generation of multiple frequencies. One arm of the bridge includes a multiple resonance reactance comprising a plurality of inductance-capacity pairs so arranged, as will be described later, that each oscillation frequency is determined mainly by one of the pairs and is, to a large degree, independent of the values of the other inductances and capacities. This arrangement of the reactance elements ensures the substantial independence and the stability of the several oscillation frequencies and at the same time simplifies the adjustment of the frequencies to the desired values. In a preferred form of the invention each frequency determining pair has associated with it a variable resistance element which responds to variations of the current flowing through it in such manner as to reduce the feed-back through the bridge when the current amplitude increases. Independent amplitude stability of each of the oscillations is thus achieved. A modified form of the invention makes use of a single variable resistance to control the R. M. S. amplitude of the combined oscillations.

The multi-frequency oscillators of the invention may be used as carrier current generators for multiplex telephone or telegraph systems and for many other types of systems such as telemetering and remote control where oscillations of a plurality of frequencies are employed. The reduction of the number of vacuum tubes achieved thereby results in substantial reduction of the initial cost and the annual charges of such systems. Among other uses may be mentioned the generation of oscillations of musical frequencies for use in electronic organs or other musical instruments. Here also the reduction of the number of vacuum tubes results in substantial savings in initial cost and power consumption.

These and other features of the invention will be more fully understood from the detailed description which follows and by reference to the accompanying drawing, of which:

Figures 1, 2, 3:
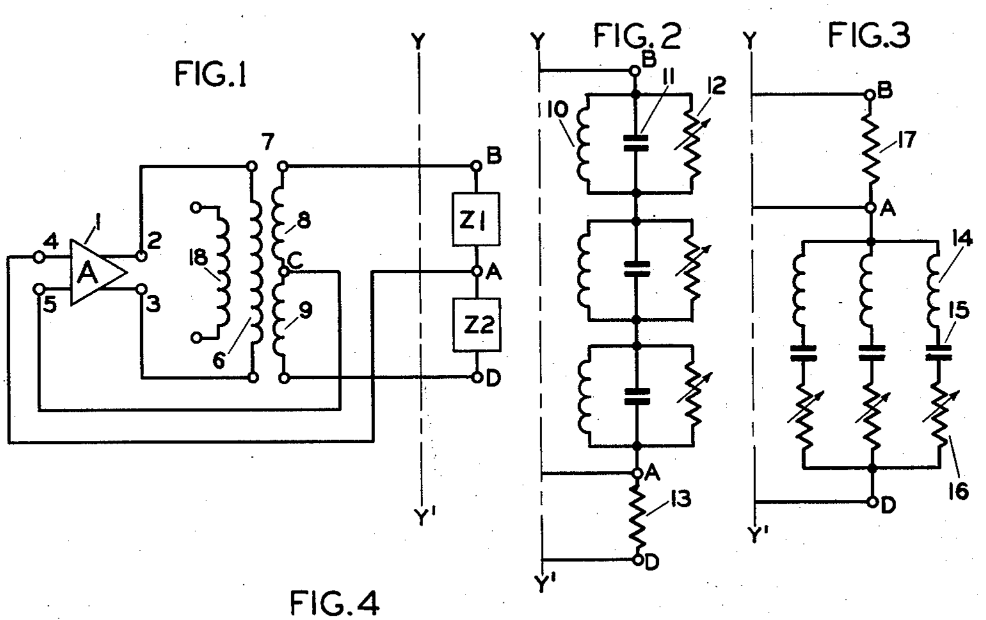
Fig. 1 is a general schematic of an oscillator in accordance with the invention.
Figs. 2 and 3 show in detail two arrangements of the portion of Fig. 1 to right of the dotted line YY.

In Fig. 1, 1 is an amplifier having output terminals 2 and 3 and input terminals 4 and 5. The amplifier may comprise one or more vacuum tube stages and preferably should have high gain and a phase shift as closely as possible equal to either zero or 180 degrees. Methods of amplifier design to meet these requirements are familiar and need not be described in detail.

The output terminals of the amplifier are connected to the primary winding 6 of the transformer 7. Two secondary windings 8 and 9 form two of the arms of a Wheatstone's bridge. These windings are connected in series-aiding relation and should be closely coupled to each other and also to the primary winding 6. The transformer may be wound to produce no reversal of phase and it will be assumed to be wound in this manner in the circuit shown. The other two bridge arms are constituted by impedances designated Z1 and Z2. The four corners of the bridge are designated A, B, C, D in the drawing. Diagonally opposite corners A and C are connected to input terminals 4 and 5 respectively of the amplifier. Power may be taken from the oscillator by means of an extra secondary winding 18 or by a circuit connected directly to the amplifier. In certain cases, particularly where the oscillation frequencies are of the order of 200 kilocycles, it is desirable that the inductive windings 8 and 9 be equal and equally coupled to the windings 6 and 18.

One of the impedances Z1 and Z2 is constituted by a non-inductive resistance 13, and the other by a multiple resonance reactance. The choice of the branch to include the reactive impedance depends upon certain factors, namely, the amplifier phase shift, zero to 180 degrees, the configuration of the reactive impedance, the location of the amplitude controlling varistors, and, in certain cases, the necessity of avoiding possible ambiguity of the oscillation frequency valves.

Figures 2 and 3 show two arrangements of impedances Z1 and Z2 for the case where the amplifier phase shift is 180 degrees and where independent amplitude stabilization of the several oscillations is employed. In each example the circuit is arranged to provide simultaneous oscillations of three different frequencies, but it is to be understood that this does not represent the limit of the capability of the invention. In actual experiments as many as 10 or more frequencies have been produced simultaneously.

In Fig. 2 the lower impedance Z2 is a pure resistance and the upper impedance Z is constituted by three parallel connected inductance-capacity pairs, such as 10 and 11, connected together in series. Each pair is shunted by an amplitude dependent variable resistance, such as 12, having a resistance which decreases in value as the amplitude of the current therein increases. These varistors may be of the thermally responsive type such as silver sulphide or the like, but they should be quickly responsive for many purposes and I have found that voltage responsive elements such as copper oxide rectifiers or elements of silicon carbides are practical and economical for the purpose.

The reactive impedance shown in Fig. 2 has three antiresonance frequencies, each of which is closely determined by the inductance and capacity of one of the pairs. At these frequencies the impedance is purely resistive and is substantially equal to the resistance of the varistor connected to the respective anti-resonant pair. Oscillations at the anti-resonance frequencies are produced by making each of the varistor resistances somewhat greater than the resistance 13. The unbalance of the bridge in this sense ensures that the voltage fed back to the amplifier input is in the correct phase to produce self oscillation. The flow of current in the varistor by reducing its resistance tends to bring the bridge closer to a balanced condition, thereby stabilizing the oscillation amplitude in the manner described in the above mentioned Meacham patent. At the series resonance frequencies, which alternate in the frequency scale with the anti-resonances, the resistive impedance of the branch is low and the resulting unbalance of the bridge is in such sense as to prevent self oscillation. The varistor resistances may be proportioned to make the oscillation amplitude equal or in any desired relation to each other.

As pointed out by Meacham in the patent referred to, a certain ambiguity of the frequency of the oscillation may arise when the amplifier phase shift is not exactly 180 degrees unless certain circuit relationships are maintained. The essential requirement is that in the conventional vector diagram of the voltages between the bridge corners A, B, C, respectively and the corner D the circular locus of the voltage of corner A should enclose the terminus of the vector representing the voltage at corner C. With respect to Figure 2 this condition is met by the proportions of the varistor resistances described above.

The modification of the invention shown in Fig. 3 makes use of a reactive impedance of an inverse type to that shown in Fig. 2. The reactance consists of three series connected inductance-capacity pairs, such as 14 and 15, connected together in parallel. An amplitude responsive varistor, such as 16, is connected in series with each pair. In this modification the reactive impedance is placed in the lower bridge arm, the upper branch being constituted by a simple resistance.

The reactive branch has three resonance frequencies each of which is closely determined by the inductance and capacity of one of the pairs. At these frequencies the impedance of the branch is resistive and has a value equal to the resistance of the varistor associated with the resonant pair. Oscillations at these frequencies are produced by making the resistances of the varistors somewhat less than the resistance of the upper branch 17. The resistances of the varistors should, in this case, increase with the amplitude of the current. Small tungsten filament lamps are suitable for the purpose. At the anti-resonance frequencies of the branch the resistive impedances are high and the bridge unbalance is in such sense as to prevent self-oscillation.

Definiteness of the oscillation frequencies is obtained in the modification shown in Fig. 3 by locating the reactive impedance in the lower bridge branch and by making the varistors of lower resistance than that of the upper arm. Adjustment of each frequency is effected by varying the inductance or the capacity of the respectively resonant pair.

In the foregoing description of Figs. 2 and 3, the terms upper and lower have been used to indicate the bridge branches in which the frequency determining reactances are placed. It will be understood, of course, that this refers to the drawing and is pertinent thereto because of the absence of phase reversal in transformer 7. So long as the relationships described above between the resistances in the two branches AB and AD are maintained, the proper connections for self oscillation will be found readily in any physical embodiment.

Stability of the oscillation frequencies is helped by proportioning the reactance elements so that the phase angle of the impedance, Z1 or Z2, varies rapidly with frequency at the oscillation values. In general, this may be accomplished by making the ratios of inductance to capacity low in the circuit shown in Fig. 2, wherein oscillations take place at the anti-resonances, and high in the modification shown in Fig. 3 wherein the oscillations occur at the series resonances. In the former case the varistors 12 and branch resistance 13 should have relatively high resistances, and in the latter case the corresponding resistances should be relatively low. The actual values will, of course, be dependent on the characteristics of the amplifier and the values of the frequencies produced and may be proportioned in accordance with familiar design practices.

It may be noted that because of the presence of the varistors and unavoidable resistance in the reactance elements, the zeros of the series-resonant reactances and the poles of the parallel resonant reactances do not occur precisely at the frequencies determined by the individual inductance-capacity pairs. However, where the proportioning of the elements, indicated above, is followed, the departures of the oscillation frequencies from the resonances of the individual pairs is small and may be kept small enough to make the oscillation frequencies substantially independent of each other, at least to the extent that the adjustment of the several oscillation frequencies to their desired values is simple to accomplish.

Figure 4:
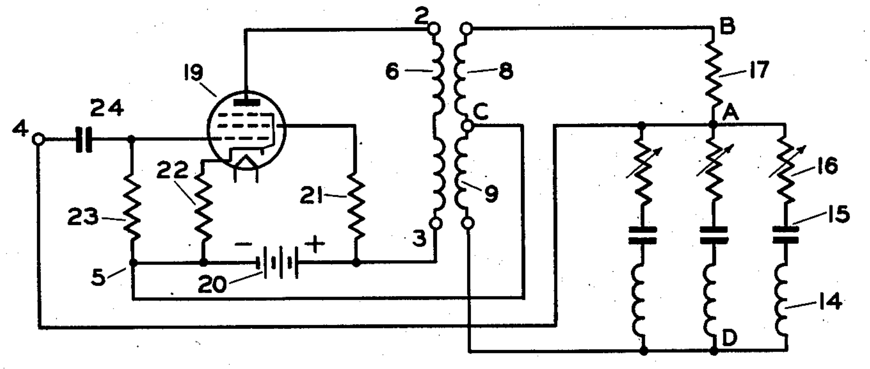
Fig. 4 is a more detailed schematic of an oscillator using the circuit arrangement of Fig. 3.

The oscillator shown in Fig. 4 is of the type illustrated in Figs. 1 and 3. The amplifier comprises a pentode vacuum tube 19 having control grid, screen grid, suppressor grid, cathode, and plate electrodes. A plate battery 20 supplies current to the plate through the primary winding 6 of transformer 7 and to the screen grid through resistor 21. Control grid bias is obtained from the space current through cathode lead resistor 22 to which the grid is connected by input resistance 23. 24 is an isolating capacity which should be large enough to have a negligible impedance at any of the oscillation frequencies. The cathode heating circuit is not shown.

The amplifier output terminals 2 and 3 and the input terminals 4 and 5 correspond to the terminals of like designation respectively in Fig. 1. The amplifier has a phase angle of 180 degrees between its input and output voltages. The other elements of the bridge circuit correspond to the similarly designated elements in Figs. 2 and 3.

Figure 5:
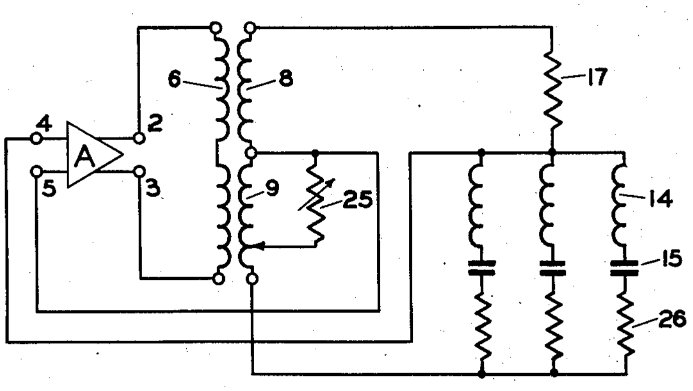
Fig. 5 shows another modification of the invention embodying a different form of amplitude control.

Figure 5 shows an oscillator, also of the type shown in Figs. 2 and 3, but modified to use a single amplitude controlling resistor. The elements in this figure correspond to like designated elements in Figs. 1 and 3. Instead of individual resistors such as 16 in Fig. 3, a single varistor 25 connected across all or part of secondary winding 9 is used. Fixed resistances such as 26 may be included in each branch as shown to make the branch resistances different from zero at the oscillation frequencies. In some cases the coil resistances may suffice. These resistances may be selected or adjusted to equalize the several oscillation amplitudes.

The varistor 25 should be of the type that decreases in resistance as the current in it increases and should initially have a resistance greater than that of resistance 17. The effect of the varistor is to regulate the amplitudes of all of the activated oscillations to substantially equal amplitudes. When a thermally responsive varistor is used its effect is to control the R. M. S. value of the current in it. This is the total current, but, since the individual oscillations are held in definite amplitude relation by the resistances 26, their amplitudes also are stabilized. A voltage responsive resistor such as one made of silicon carbide has been found to produce substantially the same result.

While the various forms of the invention illustrated use a balanced transformer type of Wheatstone's bridge, it is to be understood that the invention is not limited thereto but may also employ resistances for the branches BC and CD. However, the transformer type bridge has been found to be easy and economical to manufacture and in practice produce oscillations of great stability of both amplitude and frequency.

In the claims which follow, the terms critical frequencies are used to include both the resonance and the antiresonance frequencies of the frequency determining reactances.

What is claimed is:

1. An oscillation generator comprising an amplifier, a Wheatstone's bridge network coupling the input and the output terminals of the amplifier, said bridge network including a first arm consisting of a resistor, a second arm adjacent to the first arm comprising frequency determining elements, a transformer coupling the output of said amplifier to said first and second branches, said transformer having two coupled secondary windings connected in series aiding relation and constituting respectively the third and fourth arms of the bridge, and varistor means included in said second arm for regulating the amplitude of the generated oscillations.

2. An oscillation generator comprising an amplifier, a Wheatstone's bridge network coupling the input and the output terminals of the amplifier, said bridge network including, as one pair of adjacent branches, two coupled inductances connected in series aiding relation, a third branch comprising a substantially resistive impedance, and a fourth branch including frequency determining reactance elements and varistor means for regulating the amplitude of the generated oscillations.

3. An oscillation generator comprising an implifier, a Wheatstone's bridge network coupling the input and the output terminals of the amplifier, said bridge network including, as one pair of adjacent branches, two closely coupled inductances connected in series-aiding relation, a third branch comprising a substantially resistive impedance, and a fourth branch comprising a plurality of parallel connected inductance-capacity pairs connected together in series.

4. An oscillation generator comprising an amplifier, a Wheatstone's bridge network coupling the input and the output terminals of the amplifier, said bridge network including, as one pair of adjacent branches, two closely coupled inductances connected in series-aiding relation, a third branch comprising a substantially resistive impedance, a fourth branch comprising a plurality of parallel connected inductance-capacity pairs connected together in series, and a varistor element connected in shunt to each pair, said varistor elements having resistances which decrease in response to increasing amplitudes of the currents therein.

References Cited in the file of this patent

UNITED STATES PATENTS

| | | |
|---|---|---|
| 2,163,403 | Meacham | June 20, 1939 |
| 2,488,420 | Ludwig | Nov. 15, 1949 |
| 2,580,692 | Moe | Jan. 1, 1952 |
| 2,602,139 | Hodder et al. | July 1, 1952 |

FOREIGN PATENTS

| | | |
|---|---|---|
| 829,872 | France | July 8, 1938 |
| 547,499 | Great Britain | Aug. 31, 1942 |
| 964,010 | France | July 31, 1950 |